C. DE JONGE.
SILO.
APPLICATION FILED JAN. 30, 1911.
994,133.
Patented June 6, 1911.
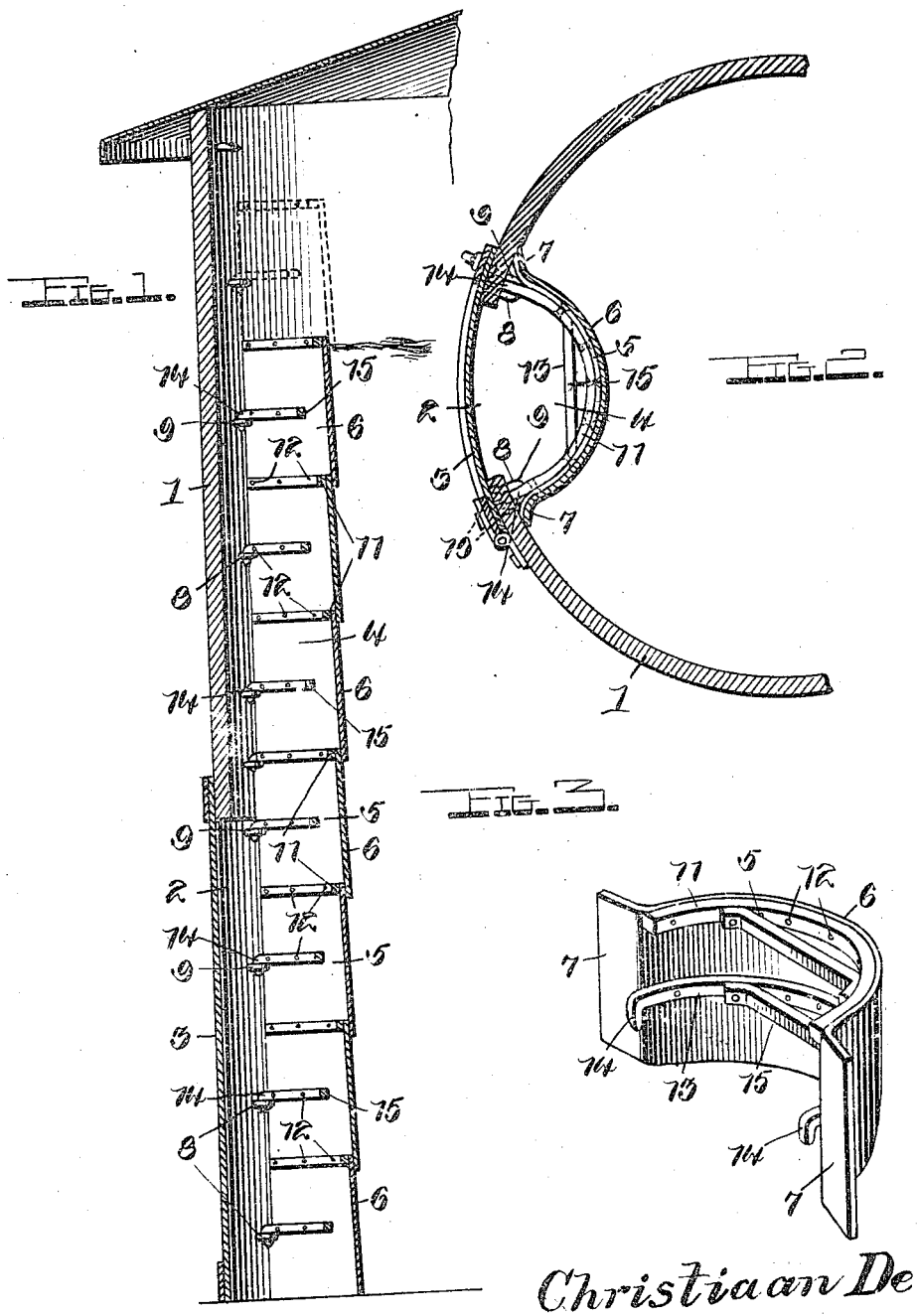
Inventor
Christiaan De Jonge.
Witnesses
By Watson E. Coleman.
Attorney

UNITED STATES PATENT OFFICE.

CHRISTIAAN DE JONGE, OF ZEELAND, MICHIGAN.

SILO.

994,133.     Specification of Letters Patent.     Patented June 6, 1911.

Application filed January 30, 1911. Serial No. 605,501.

*To all whom it may concern:*

Be it known that I, CHRISTIAAN DE JONGE, a citizen of the United States, residing at Zeeland, in the county of Ottawa and State of Michigan, have invented certain new and useful Improvements in Silos, of which the following is a specification, reference being had to the accompanying drawings.

This invention relates to improvements in silos, and especially with reference to the provision of a chute of novel construction, which is composed of detachable sections, and which enables access to be attained to the interior of the silo, so that material can be removed therefrom through the chute, and also enables the height of the chute to be regulated to correspond with that of the material in the silo, the object of the invention being to provide an improved chute which is arranged on the inner side of the silo directly against the wall thereof, and the lower end of which communicates with the door so that a person may enter the silo through the said chute, and remove ensilage from the silo by throwing the same down through the chute, the invention consisting in the construction, combination and arrangement of devices hereinafter described and claimed.

In the accompanying drawings—Figure 1 is a vertical sectional view of a portion of a silo provided with a chute constructed in accordance with my invention. Fig. 2 is a horizontal sectional view of the same. Fig. 3 is a perspective view of one section of the chute.

The silo indicated at 1 may be constructed of any suitable material, and may be of any suitable form. As usual, it is provided with a door opening 2, near its base at one side, and with a hinged door 3, to close the said opening.

In accordance with my invention, I provide a chute 4 which is disposed on the inner side of the silo, with its lower end opposite and communicating with the door opening, so that a person can enter the silo through the door opening, and by passing up through the said chute. The said chute is preferably made of sheet or plate metal and is substantially semi-tubular in form with its concave face disposed opposite the wall of the silo. The chute is composed of a series of detachable sections 5, each of which is formed of a sheet of metal comprising the semi-tubular portion 6, and the outturned ends 7 which bear against the wall of the silo at points on opposite sides of the vertical plane of the door-way. The wall of the silo is provided on its inner side with eyes 8, which are here shown as formed by U-shaped bolts 9, which extend through the wall of the silo, and are held in place thereon by the nuts 10. Instead of the U-shaped bolts 9, I may employ hooks on the outside of the silo, and eyes on the inside to hold the hooks of the chute. The sections 5 of the chute are disposed in super-posed relation and each at its lower portion partially overlaps the upper portion of the section next below. Each chute section is provided on its concave side at its upper edge with a reinforcing bar 11 of iron or other suitable metal, which is curved to correspond with the concave side of the section. The said reinforcing bar is preferably secured to the section by bolts or rivets 12, but may be secured by other suitable means within the scope of my invention. Each section of the chute is also provided at a suitable distance below the reinforcing bar 11 with a second reinforcing bar 13, the ends of which are down-turned to form the hooks 14 for engagement with the eyes 8 to detachably secure the sections to the wall of the silo. The reinforcing bars 13 are curved to fit against and are bolted to the concave side of the section. A rung 15 is bolted to and extends across the central portion of each reinforcing bar. The rungs of all the sections of the chute form a ladder in the chute which enables a person who enters the chute through the doorway to pass upwardly through the chute and thereby enter the silo at a point above the material therein.

Ensilage may be removed from the silo by throwing the same down through the chute and as material is removed from the silo and the height thereby diminishes, the sections of the chute may be detached from the upper end and replaced at a higher elevation so as to always leave an opening corresponding with the level of the ensilage in the silo.

Owing to the fact that the sections of the chute are made of sheet metal or thin plate metal, the ends thereof which bear against the inner side of the wall of the silo are flexible and pressure of the ensilage against the inner side of the chute forces the said end portions 7 closely against the inner surface of the wall of the silo and effects tight joints therewith which prevent the ensilage from becoming injured.

I claim:

1. A silo having eyes projecting inwardly from the inner side of its wall, and also having a chute comprising a series of superposed detachable sections, the said sections being provided with downturned hooks at their ends to engage the eyes and thereby detachably secure the chute sections directly to the wall of the silo.

2. A silo chute section made of flexible material, and provided at its ends with out-turned portions to bear against the inner side of the wall of a silo.

3. A silo chute made of flexible material and provided at its ends with out-turned portions to bear against the inner side of the wall of a silo, and a reinforcing bar for that portion of the chute section between the said ends thereof.

4. A silo chute section having a reinforcing bar provided at its ends with hooks.

5. A substantially semi-cylindrical silo chute section made of flexible material and provided at its ends with out-turned portions to bear against the inner side of the wall of a silo, the said chute section being provided on its inner side with a curved reinforcing bar, the said reinforcing bar having a straight central portion forming a ladder rung.

In testimony whereof I hereunto affix my signature in the presence of two witnesses.

CHRISTIAAN DE JONGE.

Witnesses:
 WILLIAM D. VAN LOO,
 ALBERT VAN LOO.